US012792690B2

(12) United States Patent
Ni et al.

(10) Patent No.: US 12,792,690 B2
(45) Date of Patent: Nov. 10, 2026

(54) METHOD, ELECTRONIC DEVICE, AND COMPUTER PROGRAM PRODUCT FOR DETECTING MODEL DRIFT

(71) Applicant: Dell Products L.P., Round Rock, TX (US)

(72) Inventors: Jiacheng Ni, Shanghai (CN); Zijia Wang, WeiFang (CN); Sanping Li, Beijing (CN); Zhen Jia, Shanghai (CN)

(73) Assignee: Dell Products L.P., Round Rock, TX (US)

(*) Notice: Subject to any disclaimer, the term of this patent is extended or adjusted under 35 U.S.C. 154(b) by 879 days.

(21) Appl. No.: 17/857,222

(22) Filed: Jul. 5, 2022

(65) Prior Publication Data

US 2023/0401287 A1 Dec. 14, 2023

(30) Foreign Application Priority Data

Jun. 10, 2022 (CN) ......................... 202210657881.9

(51) Int. Cl.
*G06F 18/21* (2023.01)
*G06F 18/23213* (2023.01)
*G06N 5/01* (2023.01)

(52) U.S. Cl.
CPC ...... *G06F 18/217* (2023.01); *G06F 18/23213* (2023.01); *G06N 5/01* (2023.01)

(58) Field of Classification Search
CPC ............. G06F 18/217; G06F 18/23213; G06F 18/2193; G06F 18/24323; G06N 5/01; G06N 20/20; G06V 10/764; G06V 10/774
See application file for complete search history.

(56) References Cited

U.S. PATENT DOCUMENTS

2019/0392250 A1* 12/2019 Aggarwal .............. G06N 20/00
2021/0279607 A1* 9/2021 Bhide ...................... G06N 5/01
(Continued)

FOREIGN PATENT DOCUMENTS

CN 110493844 A 11/2019
CN 111883219 A 11/2020
CN 112215247 A 1/2021

OTHER PUBLICATIONS

Bischof, Horst, Alěs Leonardis, and Alexander Selb. "MDL principle for robust vector quantisation." Pattern Analysis & Applications 2 (1999): 59-72. (Year: 1999).*
(Continued)

*Primary Examiner* — Sherrod L Keaton
*Assistant Examiner* — Nicholas S Wu
(74) *Attorney, Agent, or Firm* — Ryan, Mason & Lewis, LLP

(57) ABSTRACT

In a method for detecting a model drift provided in an illustrative embodiment of the present disclosure, training data in a training data set is converted into an input vector represented by Shapley values. A plurality of dimensions of the input vector indicates a plurality of input features of a decision tree model. The decision tree model has been trained for performing at least one of image classification, text classification, or data mining. The method also includes: clustering, on the basis of the input vector, the training data set, so as to obtain a plurality of data clusters. The method also includes: in response to receiving a first input, converting the first input into a first input vector represented by Shapley values. The method also includes: detecting a drift degree of the decision tree model on the basis of the first input vector and the plurality of data clusters.

15 Claims, 5 Drawing Sheets

(56) References Cited

U.S. PATENT DOCUMENTS

| | | | | |
|---|---|---|---|---|
| 2021/0365478 | A1* | 11/2021 | Mopur | G06F 18/2433 |
| 2021/0390457 | A1* | 12/2021 | Romanowsky | G06N 5/04 |
| 2023/0186144 | A1* | 6/2023 | Lopatecki | G06N 20/00<br>706/12 |

OTHER PUBLICATIONS

Dasu T, Krishnan S, Venkatasubramanian S, and Yi K. "An Information-Theoretic Approach to Detecting Changes in Multi-Dimensional Data Streams." (2006) (Year: 2006).*
Shanbhag A, Ghosh A, Rubin J. Unified shapley framework to explain prediction drift. arXiv preprint arXiv:2102.07862. Feb. 15, 2021. (Year: 2021).*
"Gaurav, An Introduction to Gradient Boosting Decision Trees, Jun. 12, 2021, Machinelearningplus.com" (Year: 2021).*
Zheng, Shihao, et al. "Labelless concept drift detection and explanation." NeurIPS 2019 Workshop on Robust AI in Financial Services: Data, Fairness, Explainability, Trustworthiness, and Privacy. 2019. (Year: 2019).*
Shanbhag, Aalok, Avijit Ghosh, and Josh Rubin. "Unified shapley framework to explain prediction drift." arXiv preprint arXiv: 2102.07862 (2021). (Year: 2021).*
S. M. Piryonesi et al., "Data Analytics in Asset Management: Cost-Effective Prediction of the Pavement Condition Index," Journal of Infrastructure Systems, vol. 26, No. 1, Mar. 1, 2020, 25 pages.
T. Hastie et al., "Boosting and Additive Trees," Chapter 10 in The Elements of Statistical Learning, 2nd Edition, 2009, pp. 337-384.
T. Chen et al., "XGBoost: A Scalable Tree Boosting System," Proceedings of the 22nd ACM SIGKDD International Conference on Knowledge Discovery and Data Mining, Aug. 2016, pp. 785-794.
B. Rozemberczki et al., "The Shapley Value in Machine Learning," arXiv:2202.05594v2, May 26, 2022, 8 pages.
Wikipedia, "k-Means Clustering," https://en.wikipedia.org/wiki/K-means_clustering, Jun. 26, 2022, 11 pages.
Wikipedia, "Shapley Value," https://en.wikipedia.org/wiki/Shapley_value, Jun. 25, 2022, 8 pages.

* cited by examiner

METHOD, ELECTRONIC DEVICE, AND COMPUTER PROGRAM PRODUCT FOR DETECTING MODEL DRIFT

RELATED APPLICATION(S)

The present application claims priority to Chinese Patent Application No. 202210657881.9, filed Jun. 10, 2022, and entitled "Method, Electronic Device, and Computer Program Product for Detecting Model Drift," which is incorporated by reference herein in its entirety.

FIELD

Embodiments of the present disclosure relate to the field of artificial intelligence, and more particularly, to a method, an electronic device, and a computer program product for detecting model drift.

BACKGROUND

Machine learning models are widely used in the field of artificial intelligence. For example, machine learning models are used for image classification, text classification, and/or data mining, and the like. The performance of a machine learning model can deteriorate over time as an environment changes (e.g., due to changes in user behavior and/or sensor drift). This phenomenon is referred to as model drift. Model drift can be generally divided into data drift and concept drift. Concept drift means that statistical characteristics of a target variable that the model is trying to predict change in an unforeseen way over time.

SUMMARY

In a first aspect of the present disclosure, a method for detecting a model drift is provided. The method includes: converting training data in a training data set into an input vector represented by Shapley values, a plurality of dimensions of the input vector indicating a plurality of input features of a decision tree model, and the decision tree model having been trained for performing at least one of image classification, text classification, or data mining. The method also includes: clustering, on the basis of the input vector, the training data set, so as to obtain a plurality of data clusters. The method also includes: in response to receiving a first input, converting the first input into a first input vector represented by Shapley values. The method also includes: detecting a drift degree of the decision tree model on the basis of the first input vector and the plurality of data clusters.

In a second aspect of the present disclosure, an electronic device is provided. The electronic device includes a processor and a memory coupled to the processor. The memory has instructions stored therein which, when executed by the processor, cause the device to perform actions. The actions include: converting training data in a training data set into an input vector represented by Shapley values, a plurality of dimensions of the input vector indicating a plurality of input features of a decision tree model, and the decision tree model having been trained for performing at least one of image classification, text classification, or data mining. The actions also include: clustering, on the basis of the input vector, the training data set, so as to obtain a plurality of data clusters. The actions also include: in response to receiving a first input, converting the first input into a first input vector represented by Shapley values. The actions also include:

detecting a drift degree of the decision tree model on the basis of the first input vector and the plurality of data clusters.

In a third aspect of the present disclosure, a computer program product is provided. The computer program product is tangibly stored on a non-transitory computer-readable medium and includes machine-executable instructions. The machine-executable instructions, when executed by a machine, cause the machine to perform the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure. In the drawings.

DETAILED DESCRIPTION

Figure 1:
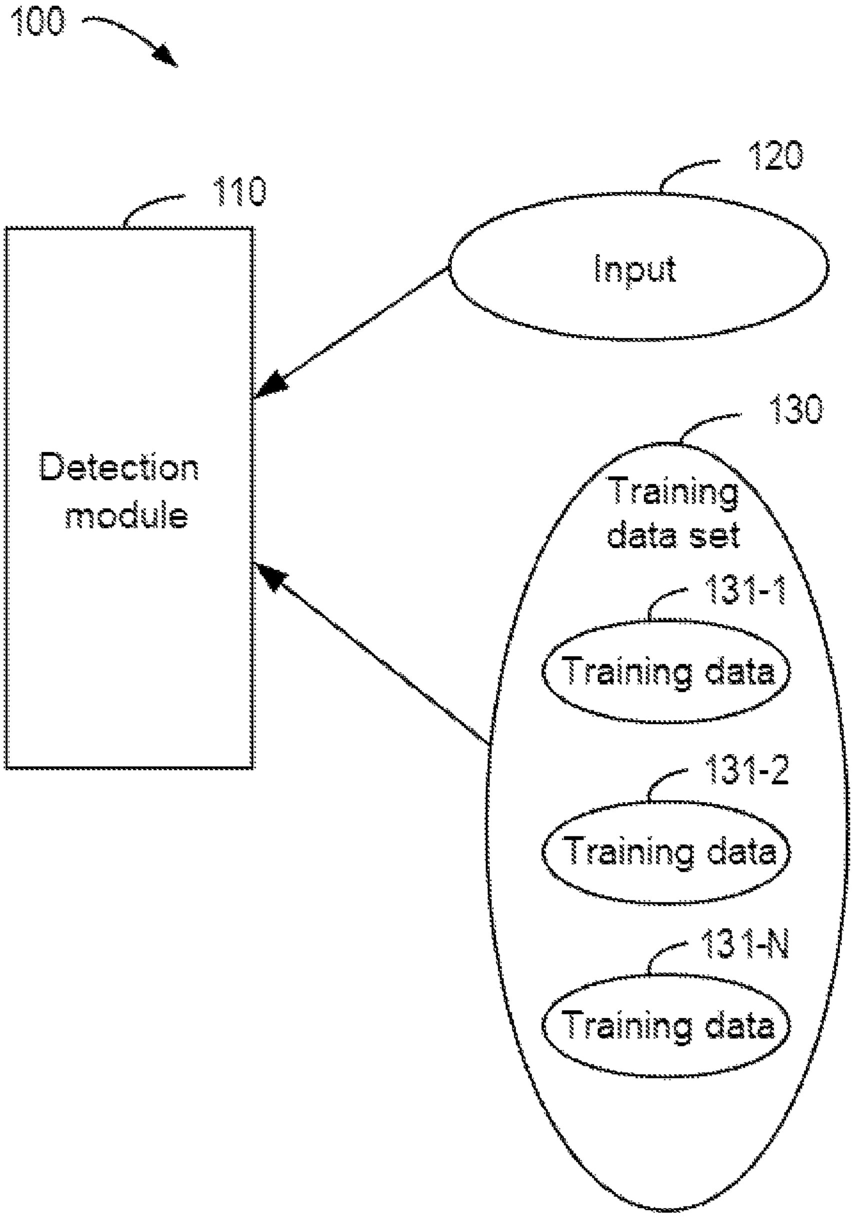
FIG. 1 illustrates a schematic diagram of an example environment in which embodiments of the present disclosure may be implemented.

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, the performance of a machine learning model can deteriorate over time as an environment changes (e.g., due to changes in user behavior and/or sensor drift). This phenomenon is referred to as model drift. When a model drift occurs, output results of image classification, text classification, or data mining using this model are not accurate enough. Therefore, the model needs to be monitored to detect whether the model has a drift. Traditional model drift detection typically relies on ground truth, original feature space, and a distribution output score. However, such model monitoring is not easy to interpret.

Embodiments of the present disclosure provide a solution for detecting a model drift. According to various embodiments of the present disclosure, training data in a training data set is converted into an input vector represented by Shapley values. The decision tree model has been trained for performing at least one of image classification, text classification, or data mining. The training data set is clustered on the basis of such input vector, so as to obtain a plurality of data clusters. In response to receiving a first input, the first input is converted to a first input vector represented by Shapley values. A drift degree of the decision tree model is detected on the basis of the first input vector and the plurality of data clusters.

According to embodiments described herein, training data and a new input for a model are converted into forms represented by Shapley values, so that it can be determined whether the relationship among input features of the new input changes in comparison with the relationship among input features of training data that has been used. In this way, the drift degree of a model can be detected, thus avoiding inaccurate or even wrong model predictions using a drifted model, and ensuring that results of image classification, text classification, or data mining are more accurate. In addition, model monitoring is also easier to interpret.

Basic principles and some example implementations of the present disclosure will be described below with reference to the accompanying drawings. It should be understood that these example embodiments are given only to enable those skilled in the art to better understand and thus implement the embodiments of the present disclosure, and are not intended to limit the scope of the present disclosure in any way.

FIG. 1 illustrates a schematic diagram of an example environment 100 in which embodiments of the present disclosure may be implemented. As shown in FIG. 1, environment 100 includes detection module 110, input 120, and training data set 130. Training data set 130 includes training data 131-1, 131-2, and 131-N (also collectively or individually referred to as "training data 131"). N is a natural number. Training data set 130 may include training data 131 used for training an image classification model, a text classification model, or a data mining model (not shown). These models may be decision tree models. In some embodiments, these models are Gradient Boosted Decision Tree (GBDT) models. Input 120 is input data collected by these models during production.

Input 120 and training data 131 may both include a plurality of input features. For example, in some embodiments, the image classification model is used for classifying plants in an image. Input 120 and training data 131 may both include features such as color, gray scale, and outline. In some embodiments, the text classification model is used for detecting whether a product review is negative or positive. Input 120 and training data 131 may both include a plurality of positive words, a plurality of negative words, and a plurality of neutral words.

Detection module 110 detects a drift degree of a decision tree model trained using training data set 130 on the basis of input 120 and training data set 130. This will be described in detail below in conjunction with FIG. 2.

It should be understood that the structure and functions of environment 100 are described for illustrative purposes only and do not imply any limitation to the scope of the present disclosure. For example, embodiments of the present disclosure may also be applied to an environment different from environment 100. In addition, FIG. 1 only illustrates one input 120 and one training data set 130, but they are not limited to this. More inputs 120 and more training data sets 130 may be included. In addition, training data set 130 shown in FIG. 1 includes three pieces of training data 131, but it is not limited to this. The training data set may also include more or less training data 131.

Figure 2:
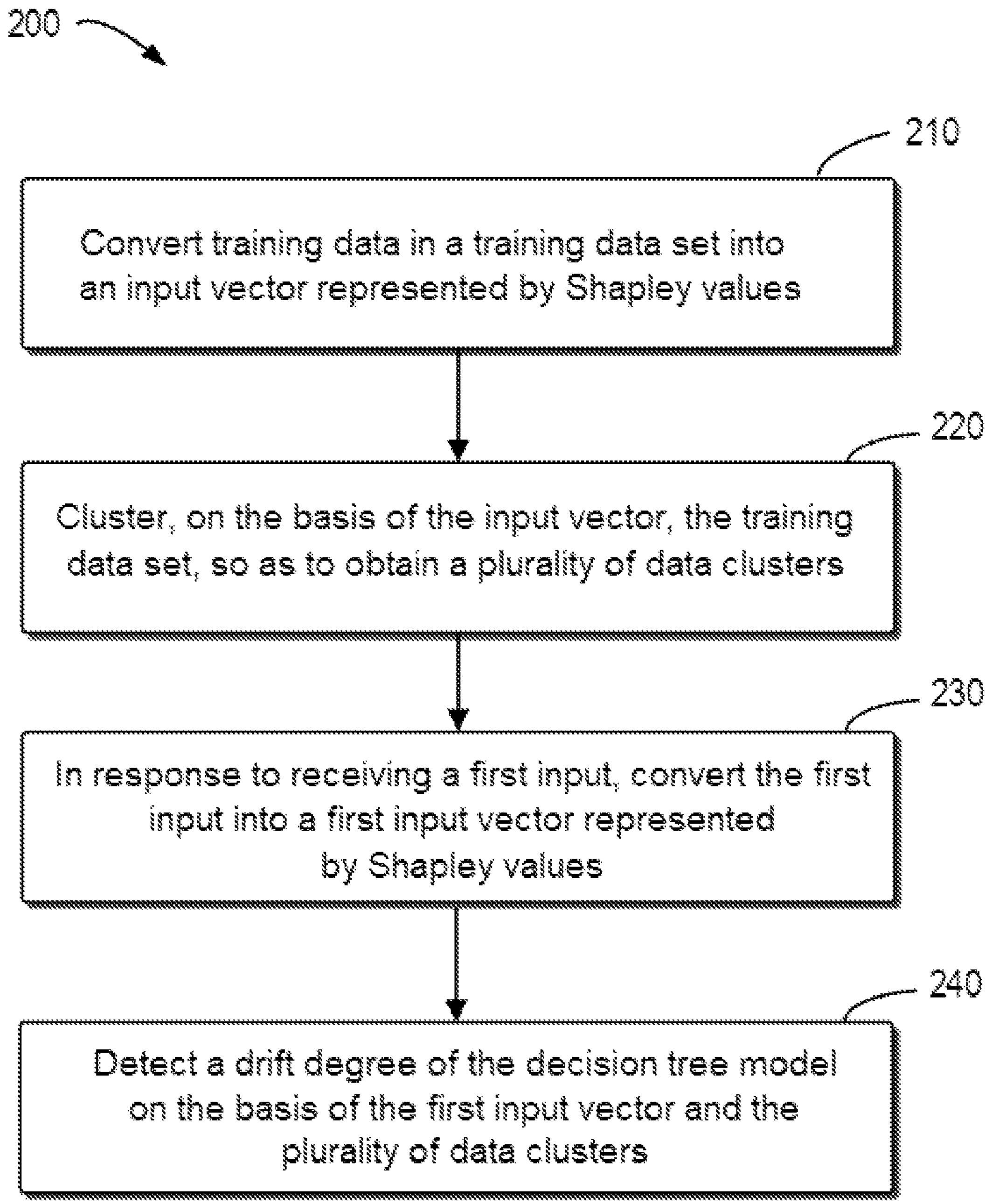
FIG. 2 illustrates a flow chart of an example method for detecting a model drift according to an embodiment of the present disclosure.

FIG. 2 illustrates a flow chart of example method 200 for detecting a model drift according to an embodiment of the present disclosure. Method 200 may be implemented by, e.g., detection module 110 as shown in FIG. 1. It should be understood that method 200 may also include additional actions not shown and/or may omit actions shown, and the scope of the present disclosure is not limited in this regard. Method 200 will be described in detail below with reference to FIG. 1.

At block 210, training data in a training data set is converted into an input vector represented by Shapley values. A plurality of dimensions of the input vector indicates a plurality of input features of a decision tree model, and the decision tree model has been trained for performing at least one of image classification, text classification, or data mining. The input vector can indicate a relationship among the plurality of input features.

For example, detection module 110 converts training data 131 in training data set 130 into an input vector represented by Shapley values. The decision tree model has been trained, using training data set 130, for performing at least one of image classification, text classification, or data mining.

In some embodiments, detection module 110 acquires, from training data 131, input data used for inputting of the decision tree model and output data used for outputting of the decision tree model. Detection module 110 converts training data 131 into an input vector represented by Shapley values by means of calculating a contribution value of each input feature in the input data to the output data. As such, contribution of each input feature to an output of a model can be intuitively shown, and a relationship among the plurality of input features can be intuitively shown.

Figure 4:
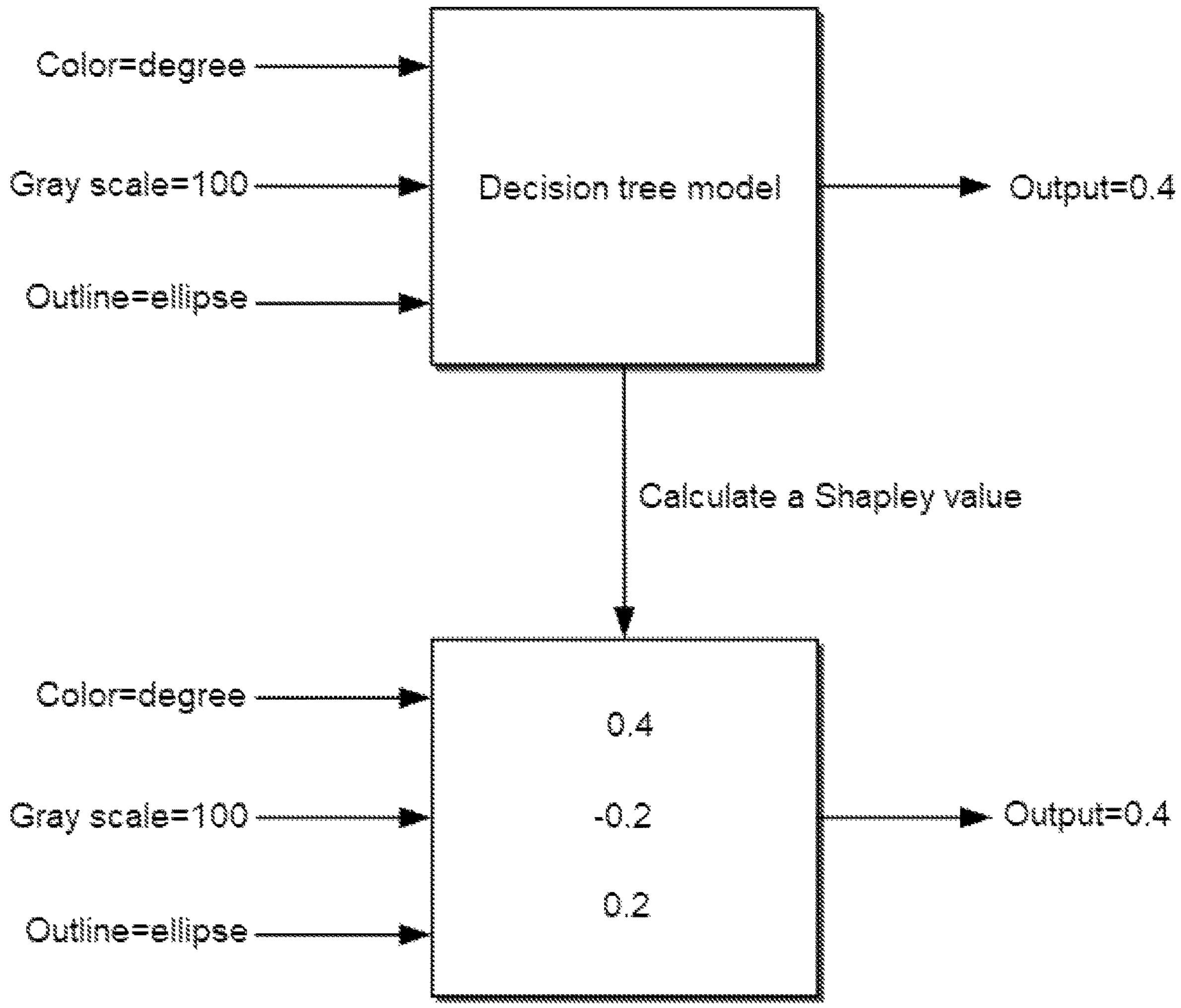
FIG. 4 illustrates a schematic diagram of converting training data into a form represented by Shapley values according to some embodiments of the present disclosure.

FIG. 4 illustrates a schematic diagram of converting training data 131 into a form represented by Shapley values according to some embodiments of the present disclosure. In some embodiments, such as an embodiment for image classification as shown in FIG. 4, training data 131 may include three features: color, gray scale, and outline. The dimension of the input vector is 3, which indicates three input features of the decision tree model: color, gray scale, and outline.

In FIG. 4, after calculation of Shapley values, the Shapley value of "color" in training data 131 is 0.4, the Shapley value of "gray scale" is −0.2, and the Shapley value of "outline" is 0.2. Thus, the input vector in the form of Shapley values is (0.4, −0.2, 0.2). The input vector indicates a relationship among the three input features.

In some embodiments, such as an embodiment for image classification, training data 131 may include two features: positive words and negative words. The dimension of the input vector is 2, which indicates two input features of the decision tree model: positive words and negative words.

It should be understood that a value of the number of input features is only exemplary and not intended to limit the scope of the present disclosure. In embodiments of the present disclosure, the number of input features may be any suitable number. Likewise, the calculated Shapley values are merely exemplary and are not intended to limit the scope of the present disclosure. In embodiments of the present disclosure, the calculated Shapley values may be any suitable values.

Referring back to FIG. 2, at block 220, the training data set is clustered on the basis of the input vector, so as to obtain a plurality of data clusters. For example, detection module 110 clusters training data set 130 on the basis of the input vector converted at block 210, so as to obtain a plurality of data clusters.

In some embodiments, detection module 110 clusters all training data in training data set 130 into a plurality of data clusters using a K-means clustering algorithm, such as k data clusters, wherein k is a preset natural number. The number k of data clusters is greater than the number of the plurality of input features. Alternatively, k may not be preset, which is dynamically determined in the clustering process.

Then, at block 230, in response to receiving a first input, the first input is converted to a first input vector represented by Shapley values. For example, in response to receiving input 120, detection module 110 converts input 120 into a first input vector represented by Shapley values. Conversion of input 120 is similar to that of training data 131, and further descriptions thereof are omitted here.

At block 240, a drift degree of the decision tree model is detected on the basis of the first input vector and the plurality of data clusters. For example, detection module 110 detects a drift degree of the decision tree mode on the basis of the first input vector and the plurality of data clusters.

In this way, whether a model has a drift can be detected, thus avoiding inaccurate or even wrong model predictions using a drifted model, and ensuring that results of image classification, text classification, or data mining are more accurate. In addition, model monitoring is also easier to interpret.

Figure 3:
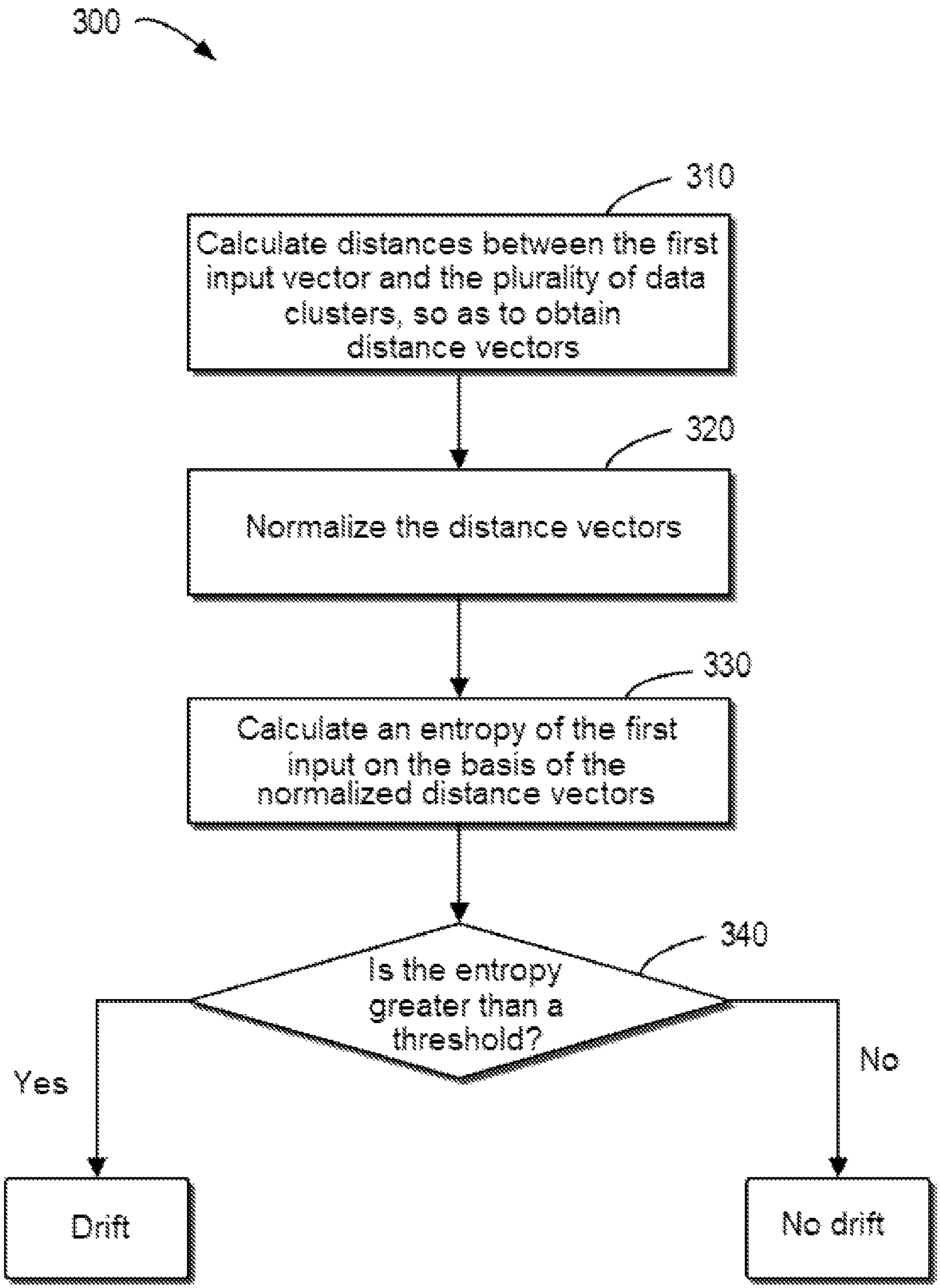
FIG. 3 illustrates a flow chart of an example method for detecting a model drift according to some embodiments of the present disclosure.

FIG. 3 illustrates a flow chart of example method 300 for detecting a model drift according to some embodiments of the present disclosure. FIG. 3 may be regarded as an example implementation of block 240 in method 200. It should be understood that method 300 may also include additional actions not shown and/or may omit actions shown, and the scope of the present disclosure is not limited in this regard. Method 300 will be described in detail below with reference to FIG. 1.

At block 310, detection module 110 calculates distances between the first input vector and the plurality of data clusters, so as to obtain distance vectors. In some embodiments, detection module 110 calculates a centroid of each of the plurality of data clusters. Detection module 110 then calculates distances between the first input vector and the centroids of the plurality of data clusters.

At block 320, detection module 110 normalizes the distance vectors. In some embodiments, detection module 110 normalizes distance vectors by calculating a ratio of each distance in the distance vectors to a total distance. For example, the distance vectors may be normalized using following formula (1):

$$p_i = \frac{d_i}{\sum_{i=1}^{k} d_i} \tag{1}$$

where $p_i$ represents the ith element of the normalized distance vectors; $d_i$ represents the ith element of the distance vectors; and k represents the number of data clusters.

It should be understood that elements of the normalized distance vectors shown in formula (1) are only exemplary, but are not intended to limit the content of the present disclosure. In embodiments of the present disclosure, the elements of the normalized distance vectors may also be expressed in other suitable ways.

At block 330, detection module 110 calculates an entropy of input 120 on the basis of the normalized distance vectors. In some embodiments, an entropy of input 120 may be calculated using following formula (2):

$$-\sum_{i=1}^{k} p_i \log p_i \tag{2}$$

where $p_i$ represents the ith element of the normalized distance vectors, and k represents the number of data clusters.

It should be understood that the entropy of input 120 shown in formula (2) is merely exemplary, and is not intended to limit the content of the present disclosure. In embodiments of the present disclosure, the entropy of input 120 may also be expressed in other suitable ways.

At block 340, detection module 110 determines whether the entropy of input 120 is greater than a threshold. The threshold may be a numerical value preset according to an experience or experiment. Embodiments of the present disclosure are not limited in this aspect. For example, the threshold may be 0.5, 1, 5, 10, or 100.

It should be understood that a value of the threshold is only exemplary, and is not intended to limit the scope of the present disclosure. In embodiments of the present disclosure, the threshold may be any suitable numerical value.

The size of the entropy indicates the reliability of using the decision tree model for prediction. A larger entropy indicates that the confidence of an output of the decision tree model is lower. A smaller entropy indicates that the confidence of an output of the decision tree model is higher. In response to a determination that the entropy of input 120 is greater than the threshold, detection module 110 determines that the decision tree model has a drift. In response to a determination that the entropy of input 120 is not greater than the threshold, detection module 110 determines that the decision tree model does not have a drift.

In this way, it can be determined whether relationships between input features of the first input change in comparison with relationships between input features of training data that has been used.

Figure 5:
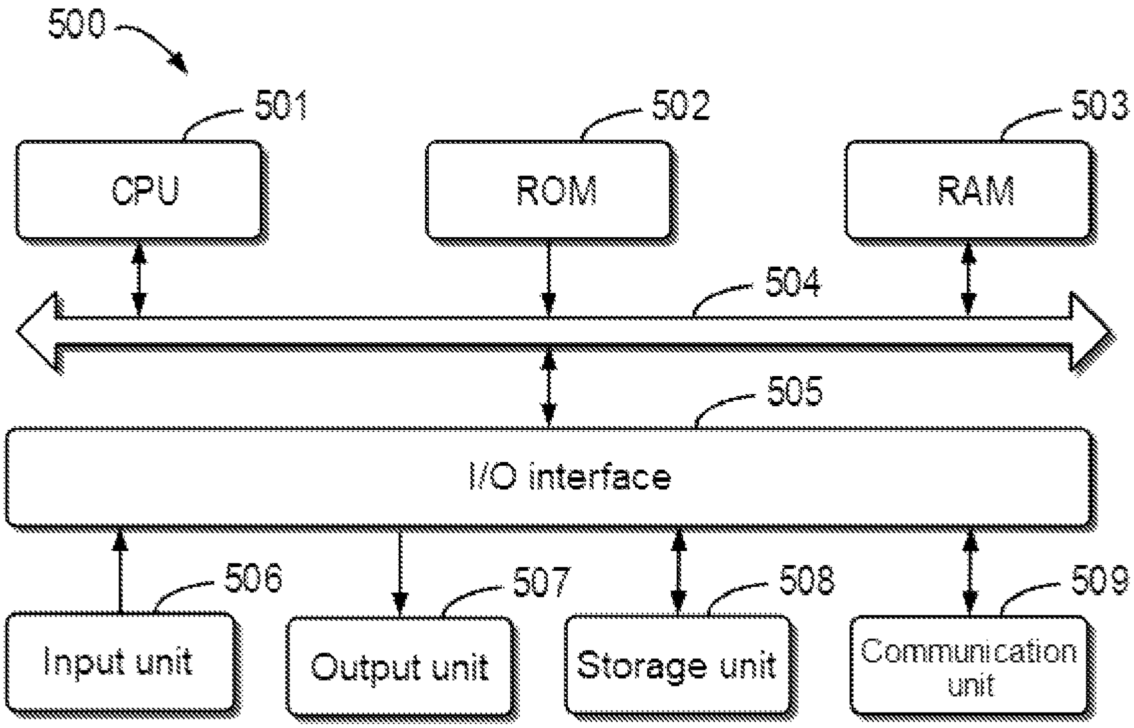
FIG. 5 illustrates a block diagram of an example device that may be used to implement embodiments of the disclosure.

FIG. 5 illustrates a schematic block diagram of example device 500 that may be used to implement embodiments of the present disclosure. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various methods and processes described above, such as method 200 and method 300, may be performed by CPU 501. For example, in some embodiments, method 200 and method 300 may be implemented as a computer software program that is tangibly included in a machine-readable medium, such as storage unit 508. In some embodiments, part of or all the computer program may be loaded and/or installed to device 500 via ROM 502 and/or communication unit 509. One or more actions of methods 200 and 300 described above may be performed when the computer program is loaded into RAM 503 and executed by CPU 501.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method, comprising:

training a decision tree model, the decision tree model comprising a Gradient Boosted Decision Tree (GBDT) model, utilizing a plurality of instances of training data in a training data set, for performing at least one of image classification, text classification, or data mining in a production environment;

deploying the trained decision tree model in the production environment;

converting, in a processor-based machine learning system, each of the instances of the training data in the training data set into a corresponding instance of an input vector represented by Shapley values, a plurality of dimensions of the input vector indicating a plurality of input features of the decision tree model, each of the instances of the input vector comprising a respective corresponding set of Shapley values, with the Shapley values of the corresponding set for a given one of the instances of the input vector being arranged in respective different dimensions of the given instance of the input vector within a feature space of the input features;

clustering, in the processor-based machine learning system and on the basis of the input vector of each of the instances of the training data, the training data set, so as to obtain a plurality of data clusters, wherein the number of the plurality of data clusters is greater than the number of the plurality of input features;

receiving in the production environment a first input for processing by the decision tree model in the processor-based machine learning system;

in response to receiving the first input in the processor-based machine learning system, converting the first input into a first input vector represented by Shapley values, the first input vector comprising an additional set of Shapley values, with the Shapley values of the additional set being arranged in respective different dimensions of the first input vector, in the feature space of the input features;

detecting, in the processor-based machine learning system, a drift degree of the decision tree model on the basis of the first input vector and the plurality of data clusters; and controlling, in the processor-based machine learning system and based on the detected drift degree, utilization of predictions generated by the decision tree model;

wherein the detecting a drift degree of the decision tree model on the basis of the first input vector and the plurality of data clusters comprises:

calculating distances between the first input vector and the plurality of data clusters, so as to obtain distance vectors;

normalizing the distance vectors;

calculating an entropy of the first input on the basis of the normalized distance vectors; and in response to the entropy being greater than a threshold, determining that the decision tree model has a drift.

2. The method according to claim 1, wherein the calculating distances between the first input vector and the plurality of data clusters comprises:

calculating a centroid of each of the plurality of data clusters; and calculating distances between the first input vector and the centroids of the plurality of data clusters.

3. The method according to claim 1, wherein the normalizing the distance vectors comprises:

calculating a ratio of each distance in the distance vectors to a total distance.

4. The method according to claim 1, wherein the clustering the training data set comprises:

clustering all training data in the training data set into a plurality of data clusters using a K-means clustering algorithm.

5. The method according to claim 1, wherein the converting the training data in the training data set into an input vector represented by Shapley values comprises:

acquiring, from the training data, input data used for inputting of the decision tree model and output data used for outputting of the decision tree model; and calculating a contribution value of each input feature in the input data to the output data.

6. An electronic device, comprising:

at least one processor; and memory coupled to the at least one processor, the memory having instructions stored therein, wherein the instructions, when executed by the at least one processor, cause the electronic device to perform actions comprising:

training a decision tree model, the decision tree model comprising a Gradient Boosted Decision Tree (GBDT) model, utilizing a plurality of instances of training data in a training data set, for performing at least one of image classification, text classification, or data mining in a production environment;

deploying the trained decision tree model in the production environment;

converting, in a processor-based machine learning system, each of the instances of the training data in the training data set into a corresponding instance of an input vector represented by Shapley values, a plurality of dimensions of the input vector indicating a plurality of input features of the decision tree model, each of the instances of the input vector comprising a respective corresponding set of Shapley values, with the Shapley values of the corresponding set for a given one of the instances of the input vector being arranged in respective different dimensions of the given instance of the input vector within a feature space of the input features;

clustering, in the processor-based machine learning system and on the basis of the input vector of each of the instances of the training data, the training data set, so as to obtain a plurality of data clusters, wherein the number of the plurality of data clusters is greater than the number of the plurality of input features;

receiving in the production environment a first input for processing by the decision tree model in the processor-based machine learning system;

in response to receiving the first input in the processor-based machine learning system, converting the first input into a first input vector represented by Shapley values, the first input vector comprising an additional set of Shapley values, with the Shapley values of the additional set being arranged in respective different dimensions of the first input vector, in the feature space of the input features;

detecting, in the processor-based machine learning system, a drift degree of the decision tree model on the basis of the first input vector and the plurality of data clusters; and controlling, in the processor-based machine learning system and based on the detected drift degree, utilization of predictions generated by the decision tree model;

wherein the detecting a drift degree of the decision tree model on the basis of the first input vector and the plurality of data clusters comprises:

calculating distances between the first input vector and the plurality of data clusters, so as to obtain distance vectors;

normalizing the distance vectors;

calculating an entropy of the first input on the basis of the normalized distance vectors; and in response to the entropy being greater than a threshold, determining that the decision tree model has a drift.

7. The electronic device according to claim 6, wherein the calculating distances between the first input vector and the plurality of data clusters comprises:

calculating a centroid of each of the plurality of data clusters; and calculating distances between the first input vector and the centroids of the plurality of data clusters.

8. The electronic device according to claim 6, wherein the normalizing the distance vectors comprises:

calculating a ratio of each distance in the distance vectors to a total distance.

9. The electronic device according to claim 6, wherein the clustering the training data set comprises:

clustering all training data in the training data set into a plurality of data clusters using a K-means clustering algorithm.

10. The electronic device according to claim 6, wherein the converting the training data in the training data set into an input vector represented by Shapley values comprises:

acquiring, from the training data, input data used for inputting of the decision tree model and output data used for outputting of the decision tree model; and calculating a contribution value of each input feature in the input data to the output data.

11. A computer program product tangibly stored on a non-transitory computer-readable medium and comprising machine-executable instructions, wherein the machine-executable instructions, when executed by a machine, cause the machine to perform a actions comprising:

training a decision tree model, the decision tree model comprising a Gradient Boosted Decision Tree (GBDT) model, utilizing a plurality of instances of training data in a training data set, for performing at least one of image classification, text classification, or data mining in a production environment;

deploying the trained decision tree model in the production environment;

converting, in a processor-based machine learning system, each of the instances of the training data in the training data set into a corresponding instance of an input vector represented by Shapley values, a plurality of dimensions of the input vector indicating a plurality of input features of the decision tree model, each of the instances of the input vector comprising a respective corresponding set of Shapley values, with the Shapley values of the corresponding set for a given one of the instances of the input vector being arranged in respective different dimensions of the given instance of the input vector within a feature space of the input features;

clustering, in the processor-based machine learning system and on the basis of the input vector of each of the instances of the training data, the training data set, so as to obtain a plurality of data clusters, wherein the number of the plurality of data clusters is greater than the number of the plurality of input features;

receiving in the production environment a first input for processing by the decision tree model in the processor-based machine learning system;

in response to receiving the first input in the processor-based machine learning system, converting the first input into a first input vector represented by Shapley values, the first input vector comprising an additional set of Shapley values, with the Shapley values of the additional set being arranged in respective different dimensions of the first input vector, in the feature space of the input features;

detecting, in the processor-based machine learning system, a drift degree of the decision tree model on the basis of the first input vector and the plurality of data clusters; and controlling, in the processor-based machine learning system and based on the detected drift degree, utilization of predictions generated by the decision tree model;

wherein the detecting a drift degree of the decision tree model on the basis of the first input vector and the plurality of data clusters comprises:

calculating distances between the first input vector and the plurality of data clusters, so as to obtain distance vectors;

normalizing the distance vectors;

calculating an entropy of the first input on the basis of the normalized distance vectors; and in response to the entropy being greater than a threshold, determining that the decision tree model has a drift.

12. The computer program product according to claim 11, wherein the calculating distances between the first input vector and the plurality of data clusters comprises:

calculating a centroid of each of the plurality of data clusters; and calculating distances between the first input vector and the centroids of the plurality of data clusters.

13. The computer program product according to claim 11, wherein the normalizing the distance vectors comprises:

calculating a ratio of each distance in the distance vectors to a total distance.

14. The computer program product according to claim 11, wherein the clustering the training data set comprises:

clustering all training data in the training data set into a plurality of data clusters using a K-means clustering algorithm.

15. The computer program product according to claim 11, wherein the converting the training data in the training data set into an input vector represented by Shapley values comprises:

acquiring, from the training data, input data used for inputting of the decision tree model and output data used for outputting of the decision tree model; and calculating a contribution value of each input feature in the input data to the output data.

* * * * *